Figure 4:
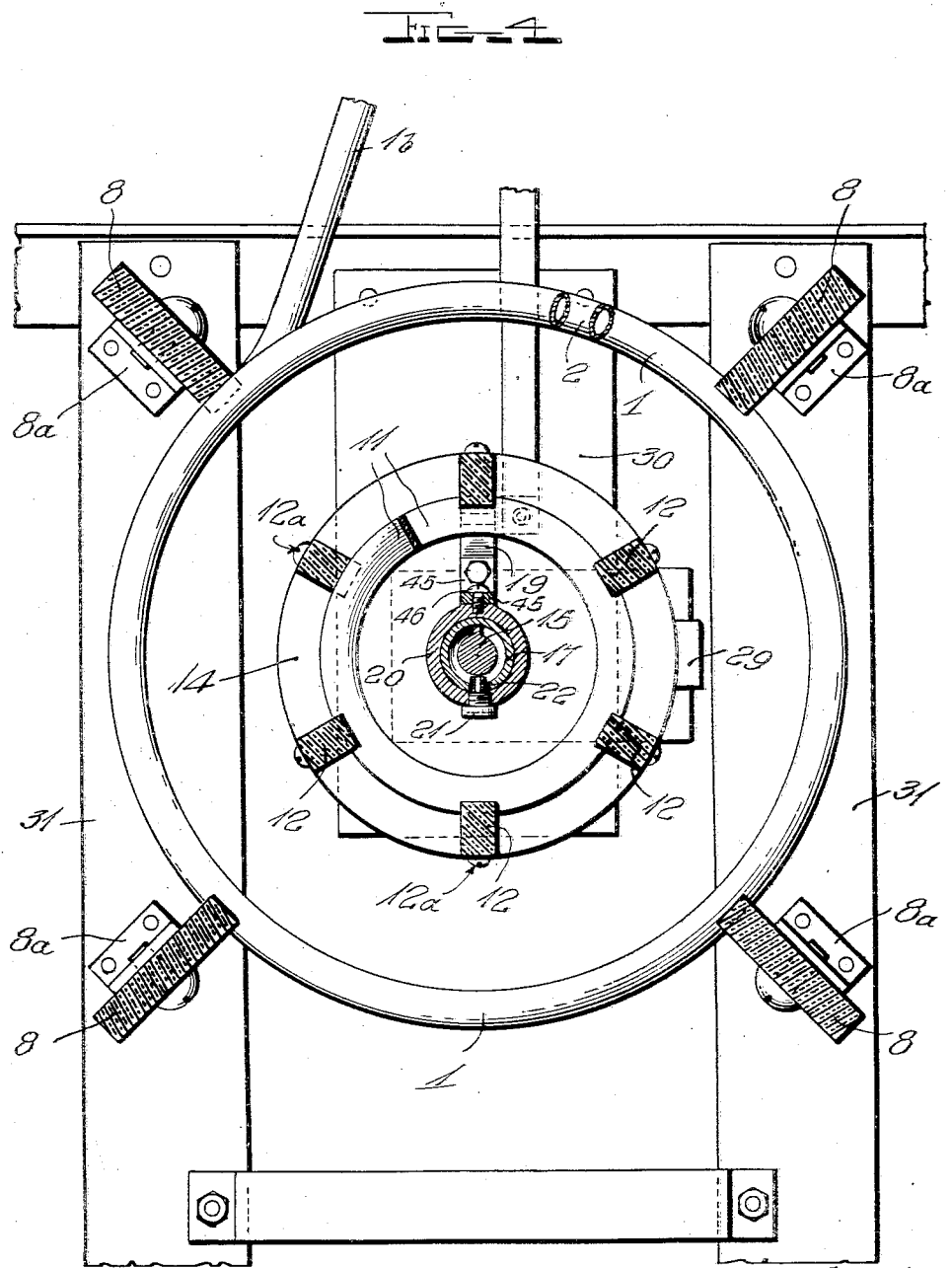

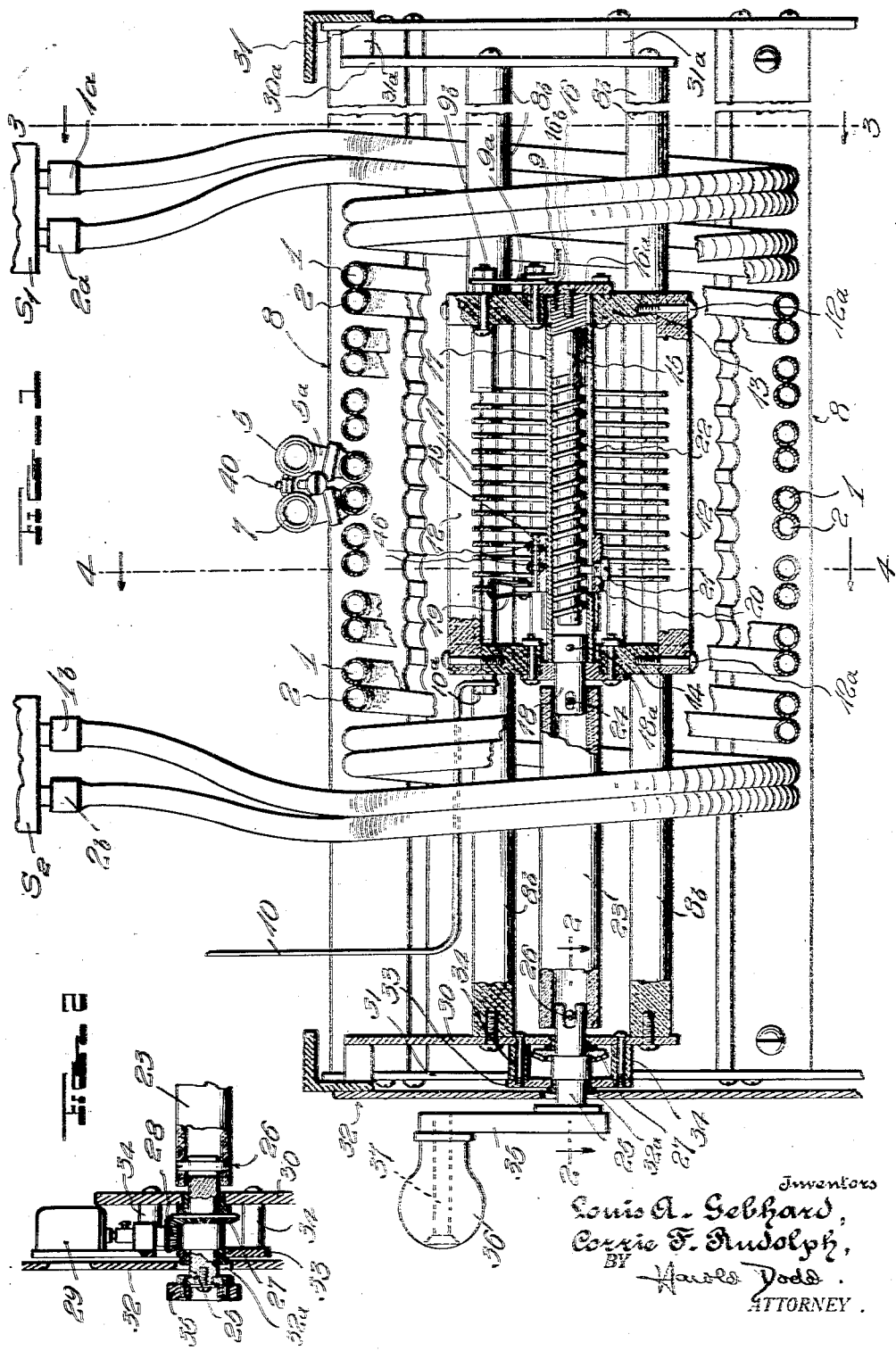

Oct. 4, 1932.  L. A. GEBHARD ET AL  1,880,199
INDUCTANCE AND COUPLING SYSTEM
Filed March 8, 1930  3 Sheets-Sheet 2
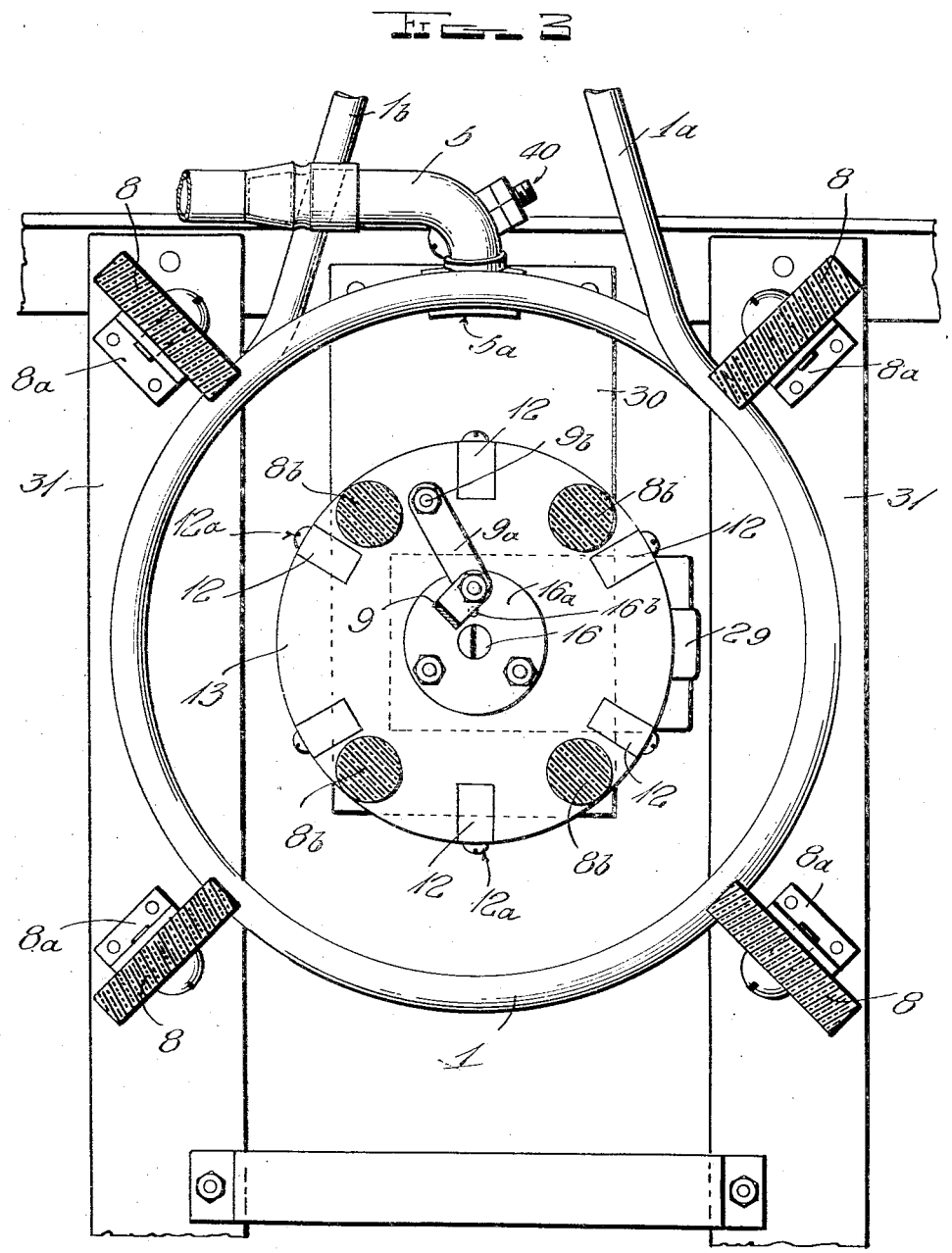

Oct. 4, 1932.  L. A. GEBHARD ET AL  1,880,199
INDUCTANCE AND COUPLING SYSTEM
Filed March 8, 1930  3 Sheets—Sheet 3

Inventors
Louis A. Gebhard,
Corrie F. Rudolph,
BY Harold Dodd
ATTORNEY.

Patented Oct. 4, 1932

1,880,199

UNITED STATES PATENT OFFICE

LOUIS A. GEBHARD AND CORRIE F. RUDOLPH, OF WASHINGTON, DISTRICT OF COLUMBIA, ASSIGNORS TO WIRED RADIO, INC., OF NEW YORK, N. Y., A CORPORATION OF DELAWARE

INDUCTANCE AND COUPLING SYSTEM

Application filed March 8, 1930. Serial No. 434,425.

Our invention relates to inductance and coupling systems employed in high frequency signaling systems.

An object of our invention is to provide an efficient adjustable coupling system for high frequency transmitters.

Another object of our invention is to provied an adjustable coupling system for balanced thermionic tube transmitting systems.

Other objects of our invention are to provide an adjustable coupling system having certain improved electrical and mechanical features, a better understanding of which can be had from the specification following and from the accompanying drawings, wherein:

Figure 1 is a side elevation of the coupling system shown partially in section; Fig. 2 shows the indicating mechanism in detail; Fig. 3 shows an end elevation of the coupling system of our invention; and Fig. 4 shows an end view partially in section of the coupling system of our invention.

In high frequency transmitting systems designed to operate over a wide frequency range it is necessary to provide some type of universal or adjustable coupling system. This coupling system is primarily necessary for coupling the energy from the transmitter proper to the antenna or load circuit. Other applications of such a coupling system are those including a satisfactory coupling between successive amplifier circuits, intercoupling of an oscillator circuit and the like. The coupling system of our invention is of the inductance type and while primarily adapted to provide efficient and universal coupling between the transmitter proper and the antenna irrespective of frequency, also affords a universal coupling system for many different arrangements employed in high frequency signaling systems. The accompanying drawings show the coupling system of our invention adapted to a balanced thermionic tube amplifier circuit whereby increased efficiency over other coupling systems is obtained.

Fig. 1 illustrates the adjustable coupling system of our invention showing a side elevation in part section. The main inductance from which the high frequency energy is to be transferred is designed to be cooled by the circulating of a cooling fluid. The fluid circulates through metallic conductors 1 and 2 which may take the form of metallic tubing as shown. Conductors 1 and 2 are brazed or sweated together forming a double conducting path for the circulating fluid and a single conducting path for the electrical energy. One end of the helical wound coil is fitted with couplings 1a and 2a adapted to connect to a thermionic tube socket $S_1$. The other end of the helical coil is likewise fitted with couplings 1b and 2b which connect to a second thermionic tube socket $S_2$. The turns 1 and 2 of metallic tubing are supported by insulating spacing bars 8. The circulating fluid is admitted at nozzle 5 and is withdrawn from nozzle 7. Nozzles 5 and 7 are provided in part 5a which is in the shape of two double T fittings.

A coupling coil is associated with the coil 1—2 above referred to and is adapted to transfer the energy therefrom. The coupling coil connections 9 and 10 lead from the coupling coil inductance 11 to the antenna or load circuit to be energized. The inductance of the coupling coil is obtained by a plurality of turns of metallic conductors 11 wound in a helical formation. One end of conductor 11 is connected to terminal 10a. Conductor 11 is preferably of edgewise-wound metallic strip as shown, however any suitable conductor may be employed. Conductor 11 is supported by spacing bars 12 of suitable insulating material. Spacing bars 12 are supported between annular insulating end members 13 and 14. A metallic rod 15 is supported along the axis of the coil and is fixed to end member 13 by screw 16 and pin 16b which pass through annular metallic end plate 16a. Rod 15 is suitably threaded as shown where the threads are substantially of the Sellers square type. A metallic tube 17 encloses rod 15 which extends coaxially therethrough but is of sufficient diameter to prevent undue friction. A longitudinal slot 22 is provided in tube 17 extending the length of the threaded portion of rod 15 to receive the projecting end of screw member 21 which is secured in the slide 20.

The width of slot 22 is slightly greater than the effective diameter of the screw 21. Slide 20 is a tubular shaped metallic member having an inside diameter slightly greater than the outside diameter of tube 17. Tube 17 is connected to shaft 18 by means of pin 18a. Shaft 18 is mounted in a suitable bearing in end member 14. Tube 17 may be secured to shaft 18 by welding, brazing, or other suitable methods so that it may be moved integrally therewith. A brush contact 19 is carried by part 20 by means of angle member 45 secured to slide 20 by screws 46. Contact 19 may comprise laminations of spring metal such as spring brass, copper, copper-bronze and the like. Brush contact 19 is made double as shown thereby gripping the conductor 11 and providing continuous electrical connection therewith. Shaft 18 is connected to shaft 23 which is constructed of suitable insulating material, in such a manner as to provide the effect of a universal joint by virtue of the slot and pin 24. Shaft 23 may comprise a rod or a length of tubing of insulating material. In a similar manner the other end of shaft 23 is connected to adjustable shaft 25 by virtue of the pin and slot arrangement 26. The effect of a universal joint provided by such an arrangement eliminates the danger of introducing any bending torque upon shaft 23 and it is not necessary that the parts 18 and 25 be aligned with as great care as might be required with a rigid connection between the members. A bevel gear 27 is carried by adjustable shaft 25 and is mechanically connected with an indicating mechanism illustrated in Fig. 2 to be referred to in more detail hereinafter.

Shaft 25 is journaled in a suitable bearing framework comprising plate 33 which is connected by spacers 34 to sub-panel 30. Sub-panels 30 and 30a are provided at opposite ends of the coil system for supporting the rods 8b. Rods 8b extend longitudinally between plate 30 and end member 14 and between plate 30a and end member 13. Spacer bushings 31a are provided between plate 30 and supporting members 31. Insulating members 8 which serve as spacers and supports for the turns of conductors 1 and 2 are mounted on members 31 by means of angle members 8a. Shaft 25 extends through aperture 32a which is formed in panel 32. A handle 36 is connected to shaft 25 by means of which the same may be revolved by turning crank 35 which carries the knob 36 secured to the end thereof by pin 37.

Fig. 2 of the accompanying drawings is a top view taken through the panel 32 and plate 30 in section showing the indicating mechanism. Bevel gear 28 is in mesh with bevel gear 27 carried by shaft 25. Bevel gear 28 is mounted on the shaft which drives the counter mechanism 29. Counter mechanism 29 comprises a plurality of adjacent drum dials adapted to advance in successive order as controlled by a suitable gear train. The gear train and drum dials are so associated as to read revolutions and fractions of revolutions of the brush 19. Readings on the counter are directly comparable to a chart giving adjustments for various frequencies so that when the coupling system is used in a transmitter the transmitter may be rapidly set or reset to transmit selected frequencies.

Figs. 3 and 4 show end elevational views of the adjustable coupling system of our invention. The rear subpanel and plate 30a are removed, the supporting rods 8 and 8b being shown in section. The inner coupling coil is carried on supporting and spacing rods 12 of suitable insulating material which extend parallel to the coil and perpendicular to annular shaped end member 13 by means of screws 12a. Supporting rods 8b extend perpendicular to annular shaped end member 13 and extend between end member 13 and the rear sub-panel. An annular shaped metallic plate 16a is provided as a cap through which a screw 16 is inserted which secures the threaded rod 15 shown in Fig. 1. A metallic connecting strip 9a is provided between metallic plate 16a and terminal 9b. Terminal 9b is connected to the plate 16a by means of binding post 16b. If desired the unused turns of the coil 11 may be short circuited by inserting link 9a between binding posts 9b and 16b. Insulating strips 8 are supported with respect to member 31 by means of angles 8a and are suitably notched to provide the proper spacing of the adjacent turns of tubing 1—2.

The operation of the adjustable coupling system of our invention can best be understood by referring to Figs. 1, 2 and 4 of the accompanying drawings. When crank 35—36 is rotated the motion is transmitted by insulated shaft 23 to shaft 18 and to metallic tubular member 17. Slide 20 is constrained to move longitudinally with respect to slot 22 of member 17 by means of screw 21. Brush 19 which is carried by slide 20 and is secured thereto by angle member 45 may be positioned diametrically opposite to screw 21 and the longitudinal slot 22. Tubular member 17 is rotated coaxially with respect to shaft 15, the latter of which is rigidly positioned. Screw 21 extends through the wall of slide 20 perpendicular to shaft 15 and engages the successive threads of the threaded portion of shaft 15. As tubular member 17 is rotated, the longitudinal slot 22 together with the threaded portion of shaft 15 controls the movement of contact arm 19. Slot 22 causes the rotary motion of arm 19 to be effected, without restricting the longitudinal movement thereof. The longitudinal movement or movement along the shaft 15 is effected by the threaded portion of the shaft 15 with which screw 21 engages. By providing such an arrangement for the rotary and longitudinal movement of contact arm 19 it may be seen that the movement is not dependent upon any guiding motion of arm 19 thereby avoiding difficulty in maintaining the desired contact with conductor 11. One end of helically wound conductor 11 is connected to terminal post 9b and the other end of the conductor is connected to terminal post 10a. Connecting leads 9 and 10 extend from the coupling system for connection to an external circuit. In the adjustment of the coupling coil as shown in Fig. 1 it will be seen that the entire length of the helical wound conductor 11 is short-circuited and that movement of contacting arm 19 may eliminate the short circuit from selected turns rendering such turns effective in the circuit. This is accomplished by virtue of one end of conductor 11 being connected to terminal post 9b and the movable arm 19 being connected through shaft 15 and tube 17 to plate 16 and through connecting strap 9a to the same terminal post 9b. This prevents the familiar "dead end" loss. Connection from the external circuit may be made direct to plate 16a thus using the coil 11 without short circuiting a selected number of turns of the coil. The inner coupling coil is mounted centrally with respect to the outer coil. The distance between the helically wound conductor 11 and the outer coil 1—2 is made relatively great. By such an arrangement it is possible to effect different adjustments of the inier coil without destroying the balanced condition of the balanced amplifier circuit. The coupling will, at all adjustments, be substantially symmetrical with respect to to the outer coil which comprises the output circuit of a balanced thermionic tube system. At the outlet and inlets 5 and 7 an insulating hose coil may be provided whereby a high electrical resistance is in effect connected between the center of the outer coil and ground. In such systems employing fluid cooled thermionic tubes the anode supply potential is connected through a choke coil to terminal 40 and to any suitable ground or cathode circuit. By providing the insulating hose coil connected to the nozzles 5 and 7, the hose coil is not subjected to high frequency potentials likely to cause potential breakdown. As shown, inlet 5 and outlet 7 are preferably located at the midpoint of conductors 1 and 2, so that cooling fluid is admitted and withdrawn at a point of minimum potential.

We realize that many modifications of our invention are possible without departing from the spirit of our invention and it is to be understood that no restrictions are to be imposed on the embodiments of our invention by the foregoing specification or by the accompanying drawings except as may be imposed by the scope of the appended claims.

What we claim as new and desire to secure by Letters Patent of the United States is as follows:

1. An inductance system comprising a frame structure, a multiplicity of insulated members extending across said frame structure, a fluid cooled conductor comprising an inductance supported by said insulated members, insulated pedestals extending between opposite ends of said frame structure, an inductance frame centrally mounted with respect to said fluid cooled inductance by said pedestal insulators, an inductance having the turns thereof supported upon said inductance frame, and remote control means extending axially through said inductances for controlling the effective number of turns of said last mentioned inductance with respect to the fluid cooled turns of said first mentioned inductance.

2. An inductance system comprising a frame structure, a multiplicity of insulated members extending through said frame structure, a fluid cooled inductance mounted on said insulated members, an insulated frame, pedestal insulators extending between the ends of said frame structure and the opposite ends of said insulated frame for centrally suspending said insulated frame with respect to the turns of said fluid cooled inductance, an inductance carried by said insulated frame, means within said inductance for adjusting the effective number of turns thereof, and remote control means extending through said fluid cooled inductance and connected to the adjusting means in said second mentioned inductance for selecting the effective number of turns therein.

3. A high frequency inductance system comprising a frame structure, a multiplicity of insulated members extending through said frame structure, a fluid cooled tube having the turns thereof lying tangent to the inner faces of said multiplicity of insulated members and forming a high frequency inductance, an insulated skeleton frame, pedestal insulators extending between the ends of said frame structure and opposite ends of said insulated skeleton frame for centrally locating said insulated skeleton frame with respect to the aforesaid high frequency inductance, an inductance carried by said insulated skeleton frame, and rotatable means extending through said last mentioned inductance for selectively eliminating a condition of short circuit along the turns of said last mentioned inductance for rendering a certain number of turns of said last mentioned inductance effective with respect to said first mentioned inductance.

4. A high frequency inductance system comprising a frame structure, a multiplicity of insulated members extending across said frame structure, a twin conductor tubular member helically wound with respect to said insulated members, means for introducing and discharging cooling fluid adjacent the center of said tubular member, an insulated skeleton frame, means attached to each end of said insulated skeleton frame and secured to said frame sturcture for centrally locating said insulated skeleton frame within said fluid cooled inductance in alignment with the inlet and discharge connections thereto, an inductance helically wound on said insulated skeleton frame, terminals for said last mentioned inductance carried on opposite ends of said insulated skeleton frame, and adjustable means extending through said insulated skeleton frame for selectively short circuiting the unused turns of said last mentioned inductance and rendering effective the turns thereof which are free of the short circuit.

5. A high frequency inductance system comprising a frame structure, a panel extending across the front of said frame structure, a plurality of insulated members carried by said frame structure and extending normal to said panel, a tubular inductance helically wound and having the turns thereof specially related and secured in position by tangential connection with the inner faces of said insulated members, an insulated skeleton frame, pedestal insulators extending normal to the panel between the ends of said frame and supported at opposite ends by said frame structure, an inductance having the turns thereof wound on the inner periphery of the insulated skeleton frame, rotatable means positioned within said insulated skeleton frame for selectively engaging the turns of said last mentioned inductance, and means extending through said panel for remotely controlling the movement of said rotatable means.

6. A high frequency inductance system comprising a frame structure, a panel extending across the front of said frame structure, a multiplicity of insulated members supported by said frame structure, a fluid cooled inductance having the turns thereof supported by said insulated members, an insulated skeleton frame, means extending normal to said panel for supporting said insulated skeleton frame centrally within said fluid cooled inductance, an inductance carried by said insulated skeleton frame, a slide engaging the turns of said last mentioned inductance and a rotatable control extending beyond the limits of said fluid cooled inductance and projecting outside of said panel for selectively controlling the position of said slide on said second mentioned inductance and correspondingly controlling the coupling between said inductances.

7. In an inductance system, a pair of insulated concentric frames, a primary coil formed of a pair of tubular conductors helically wound in parallel inside one of said frames, a helically wound secondary coil disposed inside the other of said frames and mounted coaxially within said primary coil, means for progressively selecting the effective number of turns of said secondary coil with respect to the turns of the tubular conductors constituting said primary coil.

8. In an inductance system, a pair of insulated concentric frames, a primary coil formed of a pair of tubular conductors helically wound in parallel inside one of said frames, a helically wound secondary coil disposed inside the other of said frames and mounted coaxially within said primary coil rotatable means for progressively selecting the effective number of turns of said secondary coil with respect to the turns of said primary coil and insulator members extending longitudinally of said first mentioned frame for centrally supporting said second mentioned frame with respect to said first mentioned frame.

9. In an inductance system, a pair of insulated concentric frames, a primary coil formed of a pair of tubular conductors helically wound in parallel inside one of said frames, a helically wound secondary coil disposed inside the other of said frames and mounted coaxially within said primary coil, fluid inlet means attached to one of said tubular conductors substantially at the center point thereof, fluid outlet means attached to the other of said tubular conductors substantially at the center point thereof, means for progressively selecting the effective number of turns of said secondary coil with respect to the turns of said primary coil, and insulated rod members extending from the ends of one of said frames and connected with the ends of the other of said frames for centering said last mentioned frame with respect to said first mentioned frame.

LOUIS A. GEBHARD.
CORRIE F. RUDOLPH.